United States Patent
Yu

(10) Patent No.: US 9,843,600 B1
(45) Date of Patent: *Dec. 12, 2017

(54) SYSTEM FOR DETERMINING EFFECTIVENESS AND ALLOCATION OF INFORMATION SECURITY TECHNOLOGIES

(71) Applicant: Bank of America Corporation, Charlotte, NC (US)

(72) Inventor: Sounil Yu, Reston, VA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/668,233

(22) Filed: Aug. 3, 2017

Related U.S. Application Data

(63) Continuation of application No. 14/976,743, filed on Dec. 21, 2015.

(51) Int. Cl.
  *H04L 29/06* (2006.01)
  *G06F 17/30* (2006.01)
(52) U.S. Cl.
  CPC ...... *H04L 63/1433* (2013.01); *G06F 17/3053* (2013.01)
(58) Field of Classification Search
  CPC .................................................. H04L 63/1433
  See application file for complete search history.

(56) References Cited

U.S. PATENT DOCUMENTS

| | | | | |
|---|---|---|---|---|
| 6,269,447 | B1 * | 7/2001 | Maloney | G06Q 10/06 717/124 |
| 7,013,395 | B1 * | 3/2006 | Swiler | H04L 63/1433 713/151 |

(Continued)

OTHER PUBLICATIONS

Ammann et al.; Scalable, graph-based network vulnerability analysis; Published in: Proceeding CCS '02 Proceedings of the 9th ACM conference on Computer and communications security; 2002; pp. 217-224; ACM Digital Library.*

(Continued)

*Primary Examiner* — Bradley Holder
(74) *Attorney, Agent, or Firm* — Michael A. Springs; Moore & Van Allen PLLC; Peter B. Stewart

(57) ABSTRACT

Disclosed is a computerized system for determining the collective effectiveness of information security technologies. The system typically includes a processor, a memory, and an information security analysis module stored in the memory. The system for is typically configured for: determining a security score for each element of a security technology defense matrix, a first dimension of the security technology defense matrix corresponding to a plurality of resource classes, and a second dimension of the security technology defense matrix corresponding to a plurality of security operational functions; determining a defense-in-depth score for each resource class and each security operational function; determining an aggregate security score; and providing the aggregate security score the defense-in-depth scores for each resource class and each security operational function to a user computing device. The system may be configured to provide technology deployment recommendations. Based on such recommendations, additional security technologies may be deployed.

20 Claims, 4 Drawing Sheets

(56) References Cited

U.S. PATENT DOCUMENTS

| | | | | |
|---|---|---|---|---|
| 7,376,969 B1* | 5/2008 | Njemanze | ............... | G06F 21/55 709/224 |
| 7,849,497 B1* | 12/2010 | Hurst | ..................... | H04L 41/12 713/153 |
| 8,881,288 B1* | 11/2014 | Levy | ..................... | G06F 21/577 709/225 |
| 9,223,961 B1* | 12/2015 | Sokolov | .................. | G06F 21/51 |
| 9,317,692 B2* | 4/2016 | Elder | .................... | G06F 21/577 |
| 9,449,176 B1* | 9/2016 | Adams | ................. | G06F 21/577 |
| 9,516,053 B1* | 12/2016 | Muddu | .............. | H04L 63/1425 |
| 9,660,959 B2* | 5/2017 | Hsu | .................... | H04L 63/0254 |
| 2005/0289650 A1* | 12/2005 | Kalogridis | .............. | G06F 21/53 726/22 |
| 2014/0189873 A1* | 7/2014 | Elder | ................. | H04L 63/1433 726/25 |
| 2015/0195299 A1* | 7/2015 | Zoldi | ................. | H04L 63/1433 726/25 |

OTHER PUBLICATIONS

Skaggs et al.; Network vulnerability analysis; Published in: Circuits and Systems, 2002. MWSCAS-2002. The 2002 45th Midwest Symposium on; Date of Conference: Aug. 4-7, 2002; IEEE Xplore.*

* cited by examiner

SYSTEM FOR DETERMINING EFFECTIVENESS AND ALLOCATION OF INFORMATION SECURITY TECHNOLOGIES

CROSS-REFERENCE TO PRIORITY APPLICATION

This application is a continuation of U.S. patent application Ser. No. 14/976,743 for a "SYSTEM FOR DETERMINING EFFECTIVENESS AND ALLOCATION OF INFORMATION SECURITY TECHNOLOGIES" (filed Dec. 21, 2015), which published on Jun. 22, 2017, as U.S. Patent Application Publication No. 2017/0180408, and which is herein incorporated by reference in its entirety.

FIELD OF THE INVENTION

The present invention embraces a system for determining the collective effectiveness of information security technologies and capabilities. The system typically includes a processor and a memory. The system also typically includes an information security analysis module stored in the memory, which is typically configured for: determining a security score for each element of a security technology defense matrix, a first dimension of the security technology defense matrix corresponding to a plurality of resource classes, and a second dimension of the security technology defense matrix corresponding to a plurality of security operational functions; determining a defense-in-depth score for each resource class and each security operational function; determining an aggregate security score; and providing the aggregate security score and the defense-in-depth scores for each resource class and each security operational function to a user computing device.

BACKGROUND

As the use and importance of electronic information systems has increased, the security threats to such systems have also increased. Accordingly, a need exists for an improved way of determining the aggregate effectiveness of information security technologies deployed to counter such security threats.

SUMMARY

In one aspect, the present invention embraces a computerized system, and an associated method and computer program product, for determining the effectiveness of information security technologies. The system typically includes a processor and a memory. The system also typically includes an information security analysis module stored in the memory and executable by the processor. In one embodiment, the information security analysis module is configured for: determining a security score for each element of a security technology defense matrix, each element of the security technology defense matrix being associated with one or more deployed security technologies, wherein a first dimension of the security technology defense matrix corresponds to a plurality of resource classes, and a second dimension of the security technology defense matrix corresponds to a plurality of security operational functions; determining a defense-in-depth score $D_{resource}$ for each resource class; determining a defense-in-depth score $D_{operation}$ for each security operational function; based on determining the defense-in-depth score $D_{resource}$ for each resource class and determining the defense-in-depth score $D_{operation}$ for each security operational function, determining an aggregate security score; and providing the defense-in-depth score $D_{resource}$ for each resource class, the defense-in-depth score $D_{operation}$ for each security operational function, and the aggregate security score to a user computing device.

In a particular embodiment, the defense-in-depth score $D_{resource}$ for each resource class is equal to $1-(1-E_{resource1})\times(1-E_{resource2})\times \ldots \times(1-E_{resourcen})$, wherein $E_{resource}$ corresponds to the security score for each element of the security technology defense matrix that is associated with a particular resource class and n is the total number of elements of the security technology defense matrix associated with the particular resource class.

In another particular embodiment, the defense-in-depth score $D_{operation}$ for each security operational function is equal to $1-(1-E_{operation1})\times(1-E_{operation2})\times \ldots \times(1-E_{operationm})$, wherein $E_{operation}$ corresponds to the security score for each element of the security technology defense matrix that is associated with a particular security operational function and m is the total number of elements of the security technology defense matrix associated with the particular security operational function.

In another particular embodiment, the information security analysis module is configured for: receiving half-life information for each element of the security technology defense matrix; and, based on the half-life information, the determined defense-in-depth score $D_{resource}$ for each resource class, and the determined defense-in-depth score $D_{operation}$ for each security operational function, determining a projected future defense-in-depth score for each resource class and security operational function.

In another particular embodiment, determining a security score for each element of the security technology defense matrix comprises determining a control score C for one or more controls associated with each element, the security score for each element of the security technology defense matrix being equal to $1-(1-C_1)\times \ldots \times(1-C_x)$, wherein x is the total number of controls associated with the particular element.

In another particular embodiment, the information security analysis module is configured for: receiving information regarding a plurality of future deployment scenarios; determining an aggregate security score for each of the plurality of future deployment scenarios; and, based on determining an aggregate security score for each of the plurality of future deployment scenarios, providing a technology deployment recommendation to a user computing device. In another particular embodiment, and in combination with any of the above embodiments, the information security analysis module is configured for deploying one or more additional security technologies based on the technology deployment recommendation.

In another particular embodiment, the information security analysis module is configured for: receiving information regarding a plurality of future deployment scenarios; determining a defense-in-depth score for one of the resource classes for each of the plurality of future deployment scenarios; and, based on determining a defense-in-depth score for one of the resource classes for each of the plurality of future deployment scenarios, providing a technology deployment recommendation to a user computing device. In another particular embodiment, and in combination with any of the above embodiments, the information security analysis module is configured for deploying one or more additional security technologies based on the technology deployment recommendation.

In another particular embodiment, the information security analysis module is configured for: receiving information regarding a plurality of future deployment scenarios; determining a defense-in-depth score for one of the security operational functions for each of the plurality of future deployment scenarios; and, based on determining a defense-in-depth score for one of the security operational functions for each of the plurality of future deployment scenarios, providing a technology deployment recommendation to a user computing device. In another particular embodiment, and in combination with any of the above embodiments, the information security analysis module is configured for deploying one or more additional security technologies based on the technology deployment recommendation.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
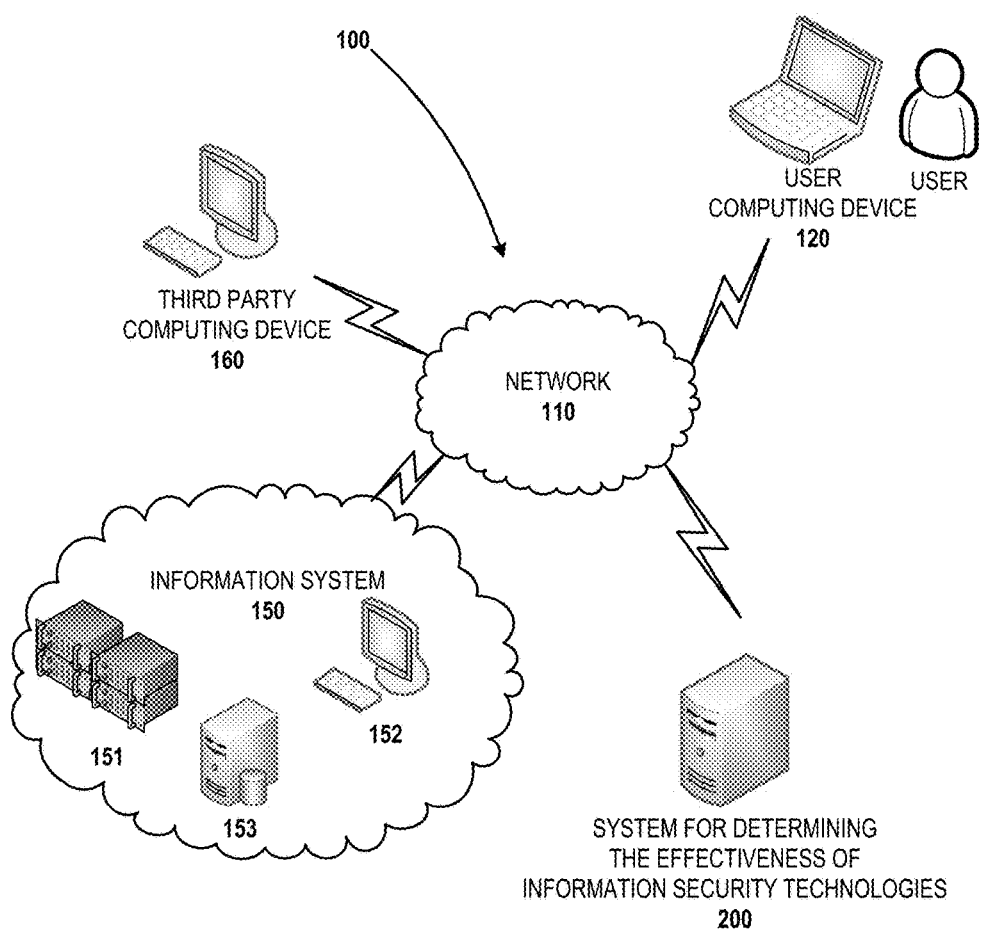
Figure 2:
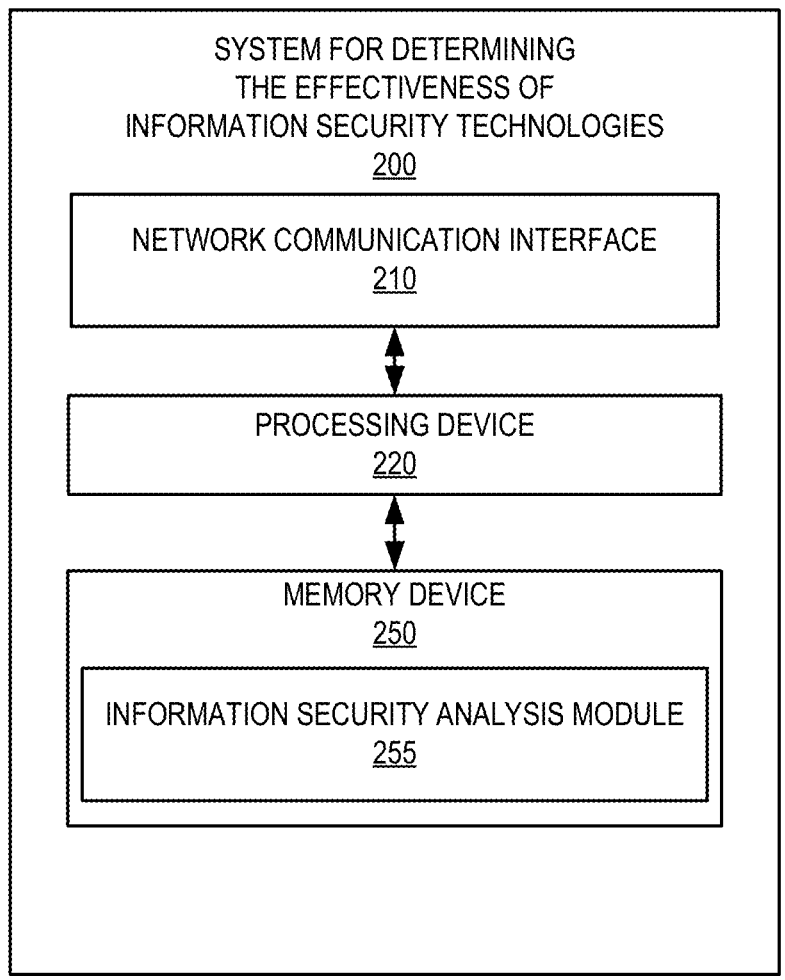
Figure 3:
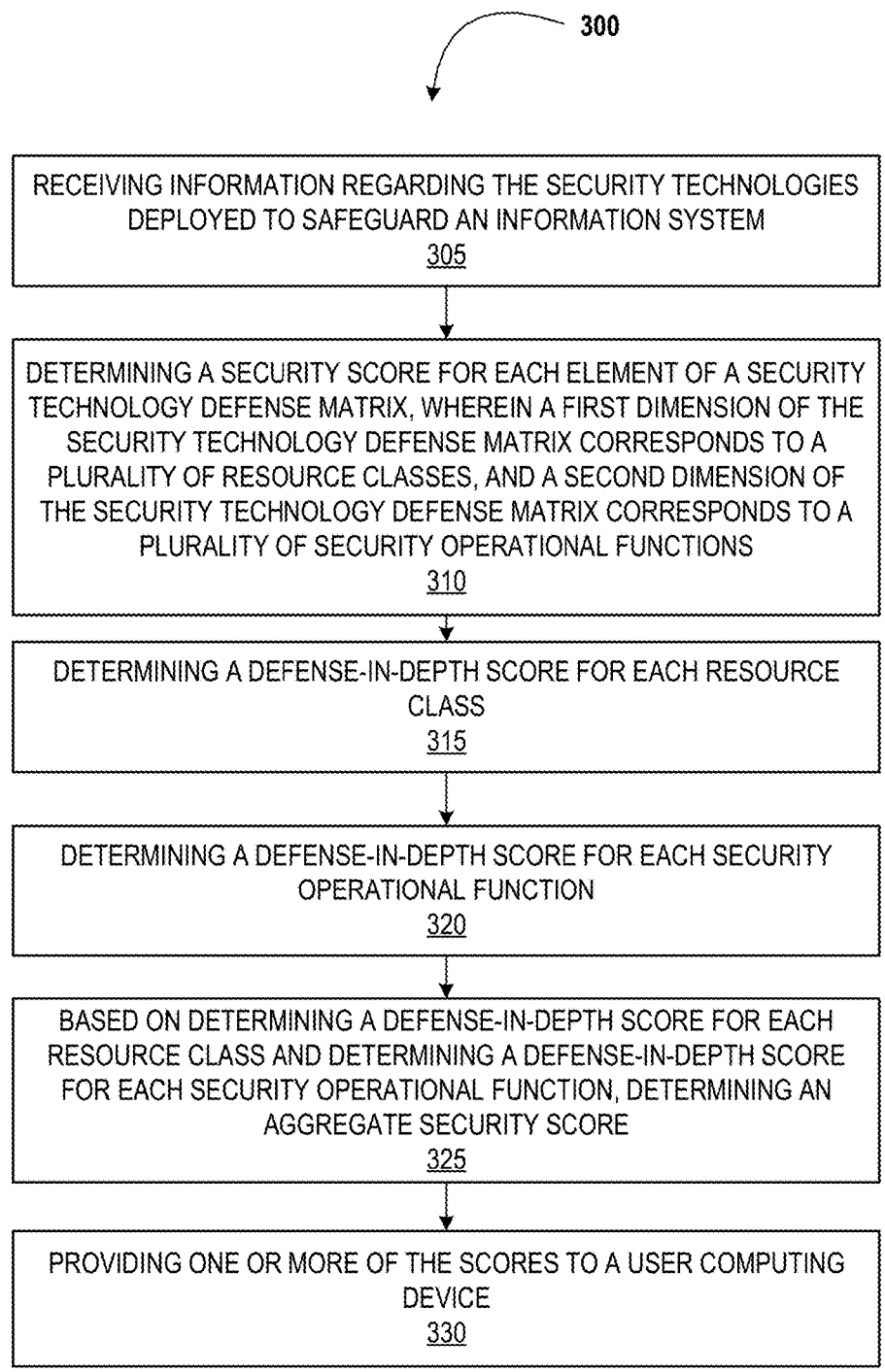
Figure 4:
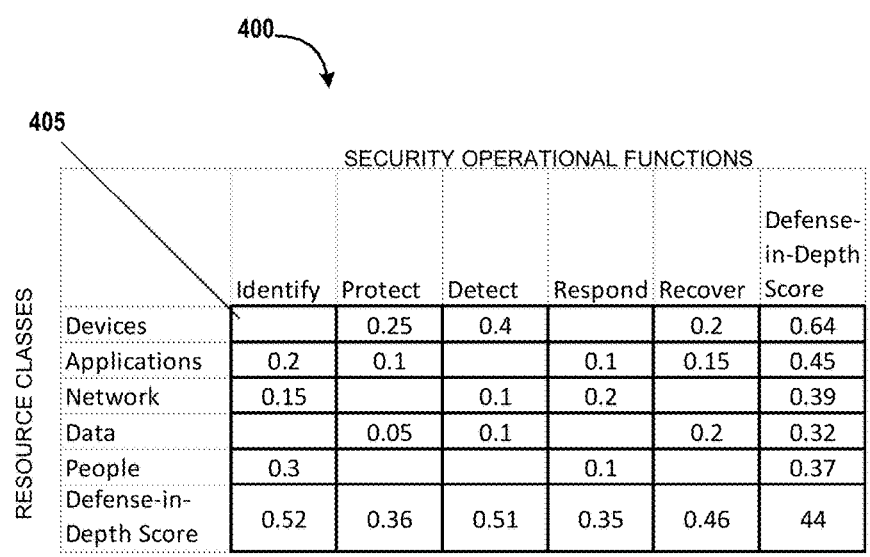

Having thus described embodiments of the invention in general terms, reference will now be made the accompanying drawings, wherein:

FIG. 1 depicts a system for determining the effectiveness of information security technologies and operating environment in accordance with an exemplary embodiment of the present invention;

FIG. 2 schematically depicts a system for determining the effectiveness of information security technologies in accordance with an exemplary embodiment of the present invention;

FIG. 3 depicts a method of determining the effectiveness of information security technologies in accordance with an exemplary embodiment of the present invention; and FIG. 4 depicts an exemplary security technology defense matrix in accordance with an exemplary embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

An "entity" may be any person or organization implementing a system for determining the effectiveness of information security technologies described herein. A "user" may be any person or entity using a system for determining the effectiveness of information security technologies described herein. Often, a user is an employee of the entity.

A "resource class" refers to a particular category of resources within an information system/operating environment. Exemplary resource classes include devices, applications, networks, data, and people. A "device" is typically any type of electronic device within an information system, such as workstations, personal computers, tablets, smartphones, servers, telephones, storage devices, network, devices, and the like. "Applications" typically refer to the software, interactions, and applications flows on the devices. "Networks" are typically the connections and traffics flowing among the devices and applications. "Data" is typically the information residing on, traveling through, and/or processed by the devices, applications, and/or networks. "People" typically are the users of the devices, applications, networks, and data.

A "security operational function" refers to a particular type of function by a security technology that safeguards aspects of an information system. Exemplary, security operational functions include identifying, protecting, detecting, responding, and recovering. "Identifying" relates to determining the exposure of the information system to security threats and may include: inventorying the resources within the information system, determining the exposure of portions of the information system to security threats, and creating a baseline of normal operation for the information system. "Protecting" relates to protecting the information system from security threats and may include: preventing unauthorized access to the system, managing access to the system, and containing and limiting the impact of attacks on the information system. "Detecting" relates to identifying attacks or other undesirable events and may include identifying unauthorized access and other anomalies in the information system. "Responding" relates to responding to an event and may include: eradicating an intrusion, assessing damage, and forensically reconstructing an attack. "Recovering" relates to recovering from an attack and may include returning to normal operations and restoring services.

In one aspect, the present invention embraces a system that may be used to determine the effectiveness of different information security technologies that are deployed to secure an information system. In this regard, the system is typically able to determine how effective deployed security technologies are in safeguarding different resources and performing different types of functions within the information system. The system may also be able to determine how effective additional security technologies may be in safeguarding the information system and provide recommendations for deploying additional security technologies.

FIG. 1 depicts an operating environment 100 according to one embodiment of the present invention. As depicted in FIG. 1, the operating environment 100 typically includes an information system 150 owned and/or operated by an entity. The information system 150 typically includes a plurality of devices, such as a server 151 and a workstation 152. The devices within the information system 150 may be configured to operate one or more applications that process information. The devices within the information system 150 are typically configured to communicate with one another, other devices operated by the entity, and devices operated by third parties (e.g., customers), such as a third party computing device 160, via a network 110. The network 110 may be any type of network, such as the Internet, wide area network, local area network, Bluetooth® network, near field network, and/or any other form of contact or contactless network. Information received, processed, and/or created by the information system 150 may be stored in one or more databases 153. The information system 150 may include all devices, applications, and networks operated by the entity or may include a subset of such devices, applications, and networks.

The information system 150 typically includes a plurality of security technologies (e.g., applications, devices, and/or processes). Each security technology typically safeguards resources within one or more resources classes in the information system 150 by performing one more security operational functions. For example, a first security technology may be configured to identify devices within the information system 150, a second security technology may be configured to detect unauthorized access of a network within the information system 150, and a third security technology may be configured to prevent unauthorized access to data stored within the information system 150.

The operating environment 100 also typically includes a system for determining the effectiveness of information security technologies 200. The system 200 may be in communication with one or more users, each having a user computing device 120, such as a PC, laptop, mobile phone, tablet, television, mobile device, wearable device, or the like (e.g., via the network 110). In some embodiments, the system 200 and/or user computing devices 120 may be part of the information system 150.

FIG. 2 depicts the system for determining the effectiveness of information security technologies 200 (also referred to as the "system 200") in more detail. As depicted in FIG. 2, the system 200 typically includes various features such as a network communication interface 210, a processing device 220, and a memory device 250. The network communication interface 210 includes a device that allows the system 200 to communicate with information system 150 and user computing devices 120 (e.g., over the network 110 (shown in FIG. 1)).

As used herein, a "processing device," such as the processing device 220, generally refers to a device or combination of devices having circuitry used for implementing the communication and/or logic functions of a particular system. For example, a processing device 220 may include a digital signal processor device, a microprocessor device, and various analog-to-digital converters, digital-to-analog converters, and other support circuits and/or combinations of the foregoing. Control and signal processing functions of the system are allocated between these processing devices (e.g., processors) according to their respective capabilities. The processing device 220 may further include functionality to operate one or more software programs based on computer-executable program code thereof, which may be stored in a memory. As the phrase is used herein, a processing device 220 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory device," such as the memory device 250, generally refers to a device or combination of devices that store one or more forms of computer-readable media for storing data and/or computer-executable program code/instructions. Computer-readable media is defined in greater detail below. For example, in one embodiment, the memory device 250 includes any computer memory that provides an actual or virtual space to temporarily or permanently store data and/or commands provided to the processing device 220 when it carries out its functions described herein.

As noted, the system 200 is configured to determine the effectiveness of the security technologies deployed to safeguard the information system 150. Accordingly, the system 200 typically includes one or more modules stored in the memory device 250, which facilitate the evaluation of such security technologies. As depicted in FIG. 2, the system 200 typically includes an information security analysis module 255.

In this regard, FIG. 3 depicts a method 300 of determining the effectiveness of security technologies that may be performed by the information security analysis module 255.

Initially, at block 305, the system 200 receives information regarding the security technologies deployed to safeguard the information system 150. This information may be any information that may be used by the system 200 to evaluate the efficacy of the security technologies deployed to safeguard the information system 150. For example, such information may identify the particular technologies employed, the resources within the information system 150 protected by such technologies, and the functions performed by such technologies. The information received may include data that may be used to evaluate the efficacy of deployed security technologies. For example, such data may indicate the percentage of attacks a particular technology may be able to prevent and/or detect. The information received may include efficacy scores associated with particular deployed technologies. For example, knowledgeable individuals within the entity may evaluate a particular deployed technology and provide a score associated with the efficacy of such technology to the system 200.

At block 310, the system 200 determines a security score for each element of a security technology defense matrix. An exemplary security technology defense matrix 400 is depicted in FIG. 4. As depicted in FIG. 4, one of the dimensions of the security technology defense matrix 400 typically relates to the classes of resources within the information system 150. A second dimension of the security technology defense matrix 400 corresponds to the different security operational functions that may be performed by the security technologies deployed to safeguard the information system 150. Each element of the security technology defense matrix 400 relates to the effectiveness of deployed security technologies in performing a particular category of security operational functions for a particular resource class. For example, the element 405 depicted in FIG. 4 relates to the effectiveness of those deployed security technologies/ devices that perform the identifying category of security operational functions to safeguard devices.

The security score for each element of the security technology defense matrix 400 may be determined based on the information received regarding the deployed security technologies. Typically, the security score for each element is between 0 and 1 with a score of 0 (or no score as depicted in FIG. 4) meaning that there are no security technologies deployed that are associated within a particular element, and a score of 1 meaning that the deployed security technologies perfectly perform the security operational functions for the resources associated with a particular element.

Typically, the security score for each element of the security technology defense matrix is based on control scores of one or more controls associated with each particular element. Each control relates to functionality of a particular deployed security technology that safeguards resources within the information system 150. Similar to the security score for each element, the control score for each control is typically between 0 and 1 with a score of 1 meaning that a particular control perfectly performs a particular security operational function for the resources associated with a particular element. In some instances, the system 200 may calculate a control score for one or more controls based on data (e.g., historical data) associated with the efficacy of the control. For example, if the system 200 uses such data to determine that a particular deployed technology is able to detect fifty percent of network intrusions, then the system 200 may assign a control score of 0.5 to the control associated with such deployed technology. In other instances, the information received by the system 200 in block 305 may include control scores associated with various control. In this regard, knowledgeable individuals within the entity may have evaluated one or more deployed technologies and provided control scores associated with the efficacy of such technologies. In some embodiments, the control scores of one or more controls may not be available. In this regard, the system 200 may assign approximate control scores based on estimated efficacy of technologies, or instead aggregate only the available control scores to determine security scores for the elements. It is also understood that security scores for some or all of the elements may be determined, based on available data.

Once the control scores for the controls have been determined, these control scores may then be aggregated to determine a security score for each element of the security technology defense matrix. In some embodiments, the security score for each element is equal to $1-(1-C_1) \times \ldots \times (1-C_x)$, wherein x is the total number of controls associated with the particular element and C is the control score for each control associated with an element. For example, if there are three controls associated with a particular element and these controls have scores of 0.1, 0.2, and 0.15, then this element would have a security score of 0.39 (i.e., $1-(1-0.1)(1-0.2)(1-0.15)=0.39$). By way of further example, if there are two controls associated with a particular element and these controls have scores of 0.1 and 0.5, then this element would have a security score of 0.55 (i.e., $1-(1-0.1)(1-0.5)=0.55$). It should be understood that the methodology described above is merely an illustrative example of one method of aggregating control scores. As such, the security scores may be determined based on any suitable and appropriate method of aggregating control scores. For example, in some embodiments, the security score for an element may comprise a linear equation of control scores with weighted values to emphasize the cost, effectiveness and importance of one or more controls. In this instance, the security score may take the form of $A+w_1(C_1)+w_2(C_2)+\ldots+w_x(C_x)$, wherein x is the total number of controls associated with the particular element, C is the control score for each control associated with an element, w is the weight of the control element and A is a constant. The values of the constant and the weights may comprise any appropriate integers or decimal values. Therefore, the security score may be determined using a suitable function f of the control scores: $f(C_1, C_2, \ldots C_x)$.

At block 315, a defense-in-depth score for each resource class is determined. In this regard, the security scores of the elements associated with each resource class may be aggregated to determine the defense-in-depth score for each resource class. In some embodiments, the defense-in-depth score $D_{resource}$ for each resource class is equal to $1-(1-E_{resource1}) \times (1-E_{resource2}) \times \ldots \times (1-E_{resourcen})$, wherein $E_{resource}$ corresponds to the security score for each element of the security technology defense matrix that is associated with a particular resource class and n is the total number of elements of the security technology defense matrix associated with the particular resource class. As depicted in FIG. 4, the defense-in-depth score for the applications resource class is 0.45 (i.e., $1-(1-0.2)(1-0.1)(1-0.1)(1-0.15)=0.45$). It should be understood that the methodology described above is merely an illustrative example of one method of aggregating security scores of a resource class. As such, the defense-in-depth score $D_{resource}$ may be determined based on any suitable and appropriate method of aggregating security scores. For example, in some embodiments, $D_{resource}$ for a class may comprise a linear equation of appropriate security scores with weighted values to emphasize the cost, effectiveness and importance of one or more elements. In this instance, the security score may take the form of: $B+k_1(E_{resource1})+k_2(E_{resource2})+\ldots+k_n(E_{resourn})$, wherein n is the total number of elements in a particular class, k is the weight of the security score and B is a constant. Therefore, defense-in-depth score $D_{resource}$ for an application resource class may be determined using a suitable function g of the security scores: $g(E_{resource1}, E_{resource2}, \ldots E_{resourcen})$.

At block 320, a defense-in-depth score for each security operational function is determined. In this regard, the security scores of the elements associated with each security operational function may be aggregated to determine the defense-in-depth score for each security operation function, In some embodiments, the defense-in-depth score $D_{operation}$ for each security operational function is equal to $1-(1-E_{operation1}) \times (1-E_{operation2}) \times \ldots \times (1-E_{operationm})$, wherein $E_{operation}$ corresponds to the security score for each element of the security technology defense matrix that is associated with a particular security operational function and m is the total number of elements of the security technology defense matrix associated with the particular security operational function. As depicted in FIG. 4, the defense-in-depth score for the recover security operational function is 0.46 (i.e., $1-(1-0.2)(1-0.15)(1-0.2)=0.46$). The aggregation methodology described above is one or the many methods that may be user to aggregate the security scores. Similar to the determination of a defense-in-depth score $D_{resource}$ for an application resource class described above, the defense-in-depth score $D_{operation}$ for each security operational function, in general, is an appropriate function h of the security scores for each element of the security technology defense matrix that is associated with a particular security operational function: $h(E_{operation1}, E_{operation2}, \ldots E_{operationm})$.

Based on determining a defense-in-depth score for each resource class and determining a defense-in-depth score for each security operational function, at block 325, an aggregate security score for the information system 150 is determined by the system 200. In this regard, the defense-in-depth scores for the resource classes and security operational functions may be aggregated by the system 200 to determine the aggregate security score, which reflects the total efficacy of the security technologies deployed to safeguard the information system 150. As depicted in FIG. 4, the aggregate security score may be the sum of the defense-in-depth scores for the resource classes and security operational functions multiplied by ten. That said, in some embodiments one or more of the defense-in-depth scores may be weighted, with same or different weights, when determining the aggregate security score. Any weighting factors applied to the defense-in-depth scores may be defined by the entity.

At block 330, one or more of the aggregate security score and the defense-in-depth scores for the resource classes and security operational functions may be provided to a user (e.g., to a computing device used by the user). Based on these scores, a user may be able to assess the efficacy of the security technologies deployed to safeguard the information system 150 and, in some instances, decide to upgrade existing security technologies and/or additional security technologies.

In some embodiments, the system 200 may be able to project futures values for the security scores of the elements of the security technology defense matrix, the defense-in-depth scores for the resource classes and security operational functions, and/or the aggregate security score. In this regard, the system 200 may receive half-life information related to the elements of the security technology defense matrix. This half-life information typically relates to how quickly the effectiveness of controls associated with an element degrades over time. For example, if the controls associated with a particular element are expected to lose half of their effectiveness after three years, the half-life associated with such element would be three years. Typically, the half-life associated with a particular element is defined by the entity and may be based on empirical data, anecdotal data and/or how frequently new technologies emerge or are likely to emerge.

Based on the received half-life information, the system may adjust previously determined values for the security scores of the elements of the security technology defense matrix, the defense-in-depth scores for the resource classes and security operational functions, and/or the aggregate security score to project a future value for one or more of such scores. For example, if the half-life associated with a particular element is three years, the projected future value in three years for the security score of such element would be half the current value for such security score. In some embodiments, a user may request that the system 200 provide future projected scores, and, based on such request, the system 200 may determine such future projected scores (e.g., using half-life information) and provide such future projected scores. These future projected scores may be used to forecast how frequently deployed security technologies may need to be upgraded or replaced.

In some embodiments, the system 200 may be able to provide technology deployment recommendations for upgrading currently deployed security technologies or deploying additional security technologies. In this regard, the system 200 may receive information regarding a plurality of future deployment scenarios. This information may include a total budget for acquiring upgrades to currently deployed security technologies or deploying additional security technologies, the costs associated with potential upgrades or additional security technologies, and information regarding the effectiveness of potential upgrades or additional security technologies (e.g., control scores associated with such potential upgrades or additional security technologies). The system 200 may use this received information to determine all possible future deployment scenarios (e.g., varying combinations of potential upgrades and/or additional security technologies) that are within the parameters of the received information (e.g., the total budget and the costs of potential upgrades or additional security technologies). For each possible future deployment scenario, the system 200 may determine an aggregate security score, a defense-in-depth score for each resource class, and/or a defense-in-depth score for each security operational function (e.g., by using substantially the same steps as described with respect to FIG. 3). Depending on the possible timing the future deployment scenarios, the scores (e.g., control scores) associated with currently deployed security technologies may be adjusted based on received half-life information as described above. Based on determining the aggregate security score and/or defense-in-depth scores for each possible future deployment scenario, the system 200 may provide a technology deployment recommendation (e.g., to a user computer device). Typically, the technology deployment recommendation is to deploy the upgrades and/or additional security technologies associated with the future deployment scenario with the highest aggregate security score or with the highest defense-in-depth score for a particular resource class or security operational function. A user may specify which of these scores should be maximized, or any other parameters, when the system 200 provides the technology deployment recommendation. Based on the technology deployment recommendation, additional security technologies and/or upgrades to currently deployed technologies may be deployed to safeguard the information system 150.

As evident from the preceding description, the system described herein represents an improvement in technology by evaluating the effectiveness of deployed information security technologies. Moreover, the system is able to evaluate different future deployment scenarios to determine which scenario would provide the most effective defense. Accordingly, the system provides a technical solution for overcoming the problem of how to allocate limited resources to effectively safeguard an information system.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A computerized system for determining the effectiveness of information security technologies, comprising:
  an information system having one or more deployed security technologies;
  a computer apparatus including a processor, a memory, and a network communication device; and
  an information security analysis module stored in the memory, executable by the processor, and configured to:
    determine a security score for each element of a security technology defense matrix, each element of the security technology defense matrix being associated with the one or more deployed security technologies of the information system, wherein a first dimension of the security technology defense matrix corresponds to a plurality of resource classes, and a second dimension of the security technology defense matrix corresponds to a plurality of security operational functions, wherein determining a security score for each element of the security technology defense matrix comprises determining a control score C for one or more controls associated with each element, the security score for each element of the security technology defense matrix being equal to $1-(1-C_1)\times \ldots \times(1-C_x)$, wherein x is the total number of controls associated with the particular element;
    determine a defense-in-depth score $D_{resource}$ for each resource class, wherein the defense-in-depth score $D_{resource}$ for each resource class is equal to $1-(1-E_{resource1})\times(1-E_{resource2})\times \ldots \times(1-E_{resourcen})$, wherein $E_{resource}$ corresponds to the security score for each element of the security technology defense matrix that is associated with a particular resource class and n is the total number of elements of the security technology defense matrix associated with the particular resource class;
    determine a defense-in-depth score $D_{operation}$ for each security operational function, wherein the defense-in-depth score $D_{operation}$ for each security operational function is equal to $1-(1-E_{operation1})\times(1-E_{operation2})\times \ldots \times(1-E_{operationm})$, wherein $E_{operation}$ corresponds to the security score for each element of the security technology defense matrix that is associated with a particular security operational function and m is the total number of elements of the security technology defense matrix associated with the particular security operational function;

based on determining the defense-in-depth score $D_{resource}$ for each resource class and determining the defense-in-depth score $D_{operation}$ for each security operational function, determine an aggregate security score; and provide the defense-in-depth score $D_{resource}$ for each resource class, the defense-in-depth score $D_{operation}$ for each security operational function, and the aggregate security score to a user computing device.

2. The computerized system according to claim 1, wherein the information security analysis module is configured to:

receive information regarding a plurality of future deployment scenarios;

determine an aggregate security score for each of the plurality of future deployment scenarios; and based on determining an aggregate security score for each of the plurality of future deployment scenarios, provide a technology deployment recommendation to a user computing device.

3. The computerized system according to claim 2, wherein the technology deployment recommendation is a recommendation to upgrade one or more of the deployed security technologies.

4. The computerized system according to claim 2, wherein the technology deployment recommendation is a recommendation to deploy one or more additional security technologies.

5. The computerized system according to claim 1, wherein the information security analysis module is configured to:

receive information regarding a plurality of future deployment scenarios;

determine a defense-in-depth score for one of the resource classes for each of the plurality of future deployment scenarios; and based on determining a defense-in-depth score for one of the resource classes for each of the plurality of future deployment scenarios, provide a technology deployment recommendation to a user computing device.

6. The computerized system according to claim 5, wherein the technology deployment recommendation is a recommendation to upgrade one or more of the deployed security technologies.

7. The computerized system according to claim 5, wherein the technology deployment recommendation is a recommendation to deploy one or more additional security technologies.

8. The computerized system according to claim 1, wherein the information security analysis module is configured to:

receive information regarding a plurality of future deployment scenarios;

determine a defense-in-depth score for one of the security operational functions for each of the plurality of future deployment scenarios; and based on determining a defense-in-depth score for one of the security operational functions for each of the plurality of future deployment scenarios, provide a technology deployment recommendation to a user computing device.

9. The computerized system according to claim 8, wherein the technology deployment recommendation is a recommendation to upgrade one or more of the deployed security technologies.

10. The computerized system according to claim 8, wherein the technology deployment recommendation is a recommendation to deploy one or more additional security technologies.

11. A computer program product for determining the effectiveness of information security technologies embodied on a non-transitory computer-readable storage medium having computer-executable instructions for:

determining, via a computer system configured for information security analysis, a security score for each element of a security technology defense matrix, each element of the security technology defense matrix being associated with one or more deployed security technologies, wherein a first dimension of the security technology defense matrix corresponds to a plurality of resource classes, and a second dimension of the security technology defense matrix corresponds to a plurality of security operational functions, wherein determining a security score for each element of the security technology defense matrix comprises determining a control score C for one or more controls associated with each element, the security score for each element of the security technology defense matrix being equal to $1-(1-C_1)\times \ldots \times(1-C_x)$, wherein x is the total number of controls associated with the particular element;

determining, via the computer system configured for information security analysis, a defense-in-depth score $D_{resource}$ for each resource class, wherein the defense-in-depth score $D_{resource}$ for each resource class is equal to $1-(1-E_{resource1})\times(1-E_{resource2})\times \ldots \times(1-E_{resourcen})$, wherein $E_{resource}$ corresponds to the security score for each element of the security technology defense matrix that is associated with a particular resource class and n is the total number of elements of the security technology defense matrix associated with the particular resource class;

determining, via the computer system configured for information security analysis, a defense-in-depth score $D_{operation}$ for each security operational function, wherein the defense-in-depth score $D_{operation}$ for each security operational function is equal to $1-(1-E_{operation1})\times(1-E_{operation2})\times \ldots \times(1-E_{operationm})$, wherein $E_{operation}$ corresponds to the security score for each element of the security technology defense matrix that is associated with a particular security operational function and m is the total number of elements of the security technology defense matrix associated with the particular security operational function;

based on determining the defense-in-depth score $D_{resource}$ for each resource class and determining the defense-in-depth score $D_{operation}$ for each security operational function, determining, via the computer system configured for information security analysis, an aggregate security score; and providing, via the computer system configured for information security analysis, the defense-in-depth score $D_{resource}$ for each resource class, the defense-in-depth score $D_{operation}$ for each security operational function, and the aggregate security score to a user computing device.

12. The computer program product according to claim 11, wherein the non-transitory computer-readable storage medium has computer-executable instructions for:

receiving information regarding a plurality of future deployment scenarios;

determining an aggregate security score for each of the plurality of future deployment scenarios; and based on determining an aggregate security score for each of the plurality of future deployment scenarios, providing a technology deployment recommendation to a user computing device.

13. The computer program product according to claim 12, wherein the technology deployment recommendation is a recommendation to upgrade one or more of the deployed security technologies.

14. The computer program product according to claim 12, wherein the technology deployment recommendation is a recommendation to deploy one or more additional security technologies.

15. The computer program product according to claim 11, wherein the non-transitory computer-readable storage medium has computer-executable instructions for:
receiving information regarding a plurality of future deployment scenarios;
determining a defense-in-depth score for one of the resource classes for each of the plurality of future deployment scenarios; and
based on determining a defense-in-depth score for one of the resource classes for each of the plurality of future deployment scenarios, providing a technology deployment recommendation to a user computing device.

16. The computer program product according to claim 11, wherein the non-transitory computer-readable storage medium has computer-executable instructions for:
receiving information regarding a plurality of future deployment scenarios;
determining a defense-in-depth score for one of the security operational functions for each of the plurality of future deployment scenarios; and
based on determining a defense-in-depth score for one of the security operational functions for each of the plurality of future deployment scenarios, providing a technology deployment recommendation to a user computing device.

17. A method for determining the effectiveness of information security technologies, comprising:
determining, via a computer system configured for information security analysis, a security score for each element of a security technology defense matrix, each element of the security technology defense matrix being associated with one or more deployed security technologies, wherein a first dimension of the security technology defense matrix corresponds to a plurality of resource classes, and a second dimension of the security technology defense matrix corresponds to a plurality of security operational functions, wherein determining a security score for each element of the security technology defense matrix comprises determining a control score C for one or more controls associated with each element, the security score for each element of the security technology defense matrix being equal to $1-(1-C_1)\times \ldots \times(1-C_x)$, wherein x is the total number of controls associated with the particular element;
determining, via the computer system configured for information security analysis, a defense-in-depth score $D_{resource}$ for each resource class, wherein the defense-in-depth score $D_{resource}$ for each resource class is equal to $1-(1-E_{resource1})\times(1-E_{resource2})\times \ldots \times(1-E_{resourcen})$, wherein $E_{resource}$ corresponds to the security score for each element of the security technology defense matrix that is associated with a particular resource class and n is the total number of elements of the security technology defense matrix associated with the particular resource class;
determining, via the computer system configured for information security analysis, a defense-in-depth score $D_{operation}$ for each security operational function, wherein the defense-in-depth score $D_{operation}$ for each security operational function is equal to $1-(1-E_{operation1})\times(1-E_{operation2})\times \ldots \times(1-E_{operationm})$, wherein $E_{operation}$ corresponds to the security score for each element of the security technology defense matrix that is associated with a particular security operational function and m is the total number of elements of the security technology defense matrix associated with the particular security operational function;
based on determining the defense-in-depth score $D_{resource}$ for each resource class and determining the defense-in-depth score $D_{operation}$ for each security operational function, determining, via the computer system configured for information security analysis, an aggregate security score; and
providing, via the computer system configured for information security analysis, the defense-in-depth score $D_{resource}$ for each resource class, the defense-in-depth score $D_{operation}$ for each security operational function, and the aggregate security score to a user computing device.

18. The method according to claim 17, comprising:
receiving information regarding a plurality of future deployment scenarios;
determining an aggregate security score for each of the plurality of future deployment scenarios;
based on determining an aggregate security score for each of the plurality of future deployment scenarios, providing a technology deployment recommendation to a user computing device; and
deploying one or more additional security technologies based on the technology deployment recommendation.

19. The method according to claim 17, comprising:
receiving information regarding a plurality of future deployment scenarios;
determining a defense-in-depth score for one of the resource classes for each of the plurality of future deployment scenarios;
based on determining a defense-in-depth score for one of the resource classes for each of the plurality of future deployment scenarios, providing a technology deployment recommendation to a user computing device; and
deploying one or more additional security technologies based on the technology deployment recommendation.

20. The method according to claim 17, comprising:
receiving information regarding a plurality of future deployment scenarios;
determining a defense-in-depth score for one of the security operational functions for each of the plurality of future deployment scenarios;
based on determining a defense-in-depth score for one of the security operational functions for each of the plurality of future deployment scenarios, providing a technology deployment recommendation to a user computing device; and
deploying one or more additional security technologies based on the technology deployment recommendation.

* * * * *